United States Patent [19]

Jorgensen et al.

[11] 4,336,820
[45] Jun. 29, 1982

[54] METERING DEVICE FOR ADDING ONE FLUID TO ANOTHER

[75] Inventors: Richard G. Jorgensen, Santa Ana; Gerald G. Steele, Mission Viejo, both of Calif.

[73] Assignee: Parker-Hannifin Corporation, Cleveland, Ohio

[21] Appl. No.: 938,555

[22] Filed: Aug. 31, 1978

[51] Int. Cl.³ .................................. G05D 11/00
[52] U.S. Cl. .................................... 137/100
[58] Field of Search ............................ 137/100

[56] References Cited

U.S. PATENT DOCUMENTS

| 1,333,986 | 3/1920 | Lundgaard | 137/100 |
| 1,363,513 | 12/1920 | Keith | 137/100 |
| 2,372,306 | 3/1945 | Adair | 137/100 X |
| 3,973,579 | 8/1976 | Ollivier | 137/100 |
| 4,057,085 | 11/1977 | Shihabi | 137/100 X |

Primary Examiner—William R. Cline
Attorney, Agent, or Firm—James A. Baker

[57] ABSTRACT

A device for adding a second fluid to a first flowing fluid in a fixed ratio regardless of the flow rate of the first fluid. The device comprises a venturi section having an inlet, an outlet and a throat therebetween through which the first fluid flows, and a regulating section that modulates the pressure of the second fluid such that the amount of second fluid delivered to the venturi throat is a fixed proportion of the first fluid flowing through the venturi section regardless of the flow rate of the first fluid. The device has particular application for adding anti-icing fluid to liquid fuel during filling of aircraft fuel tanks.

15 Claims, 3 Drawing Figures

METERING DEVICE FOR ADDING ONE FLUID TO ANOTHER

FIELD OF THE INVENTION

This invention relates to devices for mixing two fluids and more particularly to a metering device for adding an anti-icing fluid to fuel when filling an aircraft fuel tank whereby the anti-icing fluid will be added in a fixed ratio to the fuel regardless of the flow rate of the fuel through the device.

BACKGROUND OF THE INVENTION

Aircraft that utilize jet engines and which fly at high altitudes require protection against formation of ice in the liquid fuel. For commercial and military aircraft this is usually accomplished by providing heating devices and arrangements for maintaining the temperature of the fuel in the fuel feed system above temperatures at which water dispersed in the fuel would freeze. For small jet planes, such as for private and business use, the cost and complexity of heating devices and systems is relatively high and it has been found that adding an anti-icing liquid to the fuel is an acceptable substitute. However, present methods of calculating and adding correct or optimum amounts of the anti-icing fluid to the fuel are time consuming and subject to human error.

SUMMARY OF THE INVENTION

The present invention provides a valved device that is calibrated and arranged for accurately and automatically adding anti-icing fluid to the fuel in a predetermined proportion during the filling of the fuel tanks. This is accomplished by means of a venturi through which the fuel flows into the tanks and a diaphragm operated pressure regulating valve that controls flow of anti-icing fluid into the venturi throat. This regulator valve is responsive to fluid pressure upstream of the venturi and automatically modulates the pressure of the anti-icing fluid so that the flow of anti-icing fluid into the tank via the venturi throat is directly proportional to the flow of fuel into the tank.

DETAIL DESCRIPTION

Figure 1:
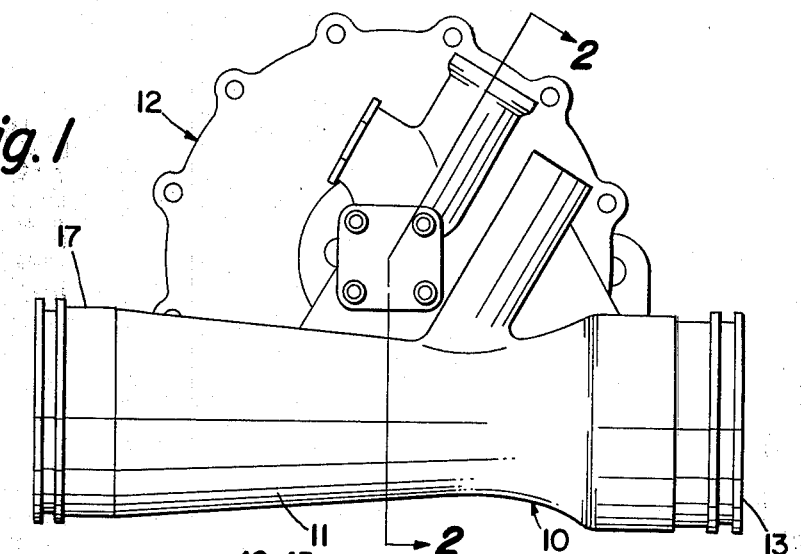
FIG. 1 is a plan view of the device, partially schematic.
Figure 2:
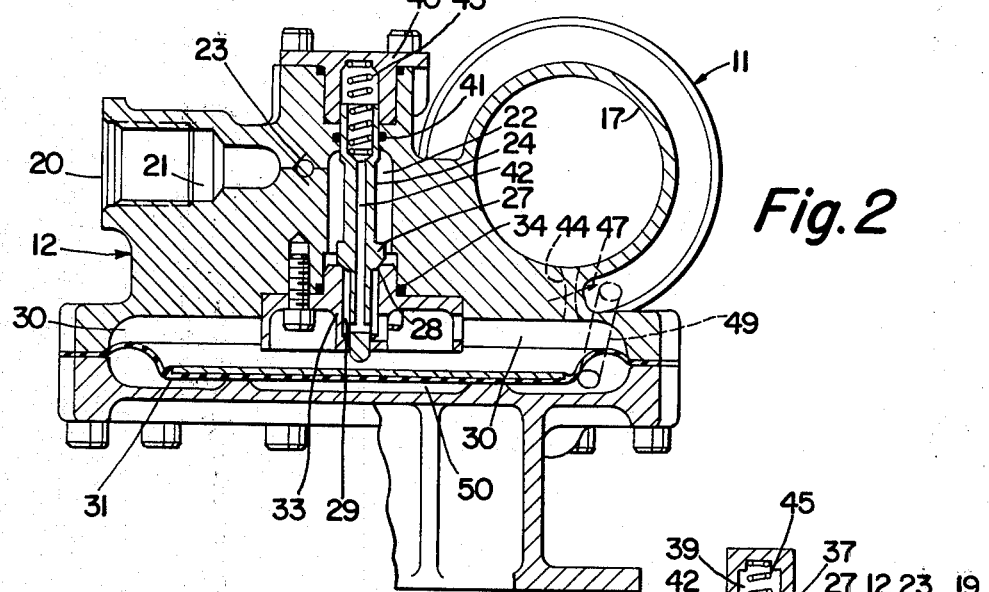
FIG. 2 is a cross section along the lines 2—2 of FIG. 1.
Figure 3:
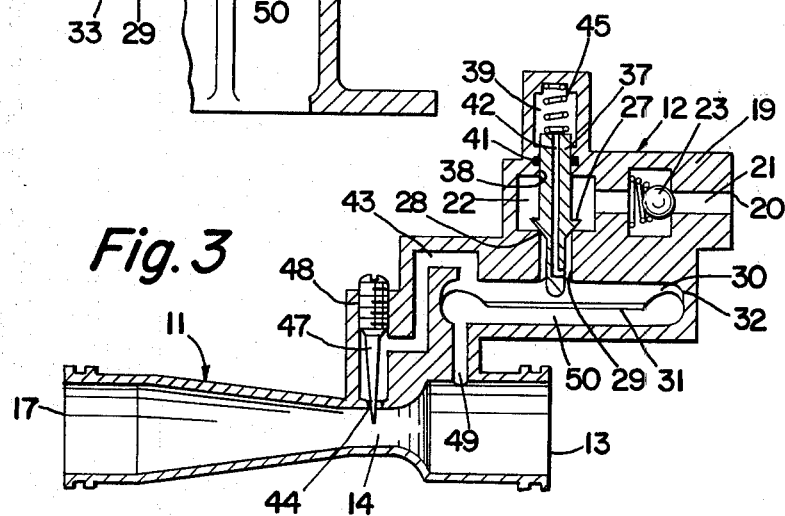
FIG. 3 is a cross section schematic view.

The device 10 generally comprises a venturi section 11 and a regulator section 12. The venturi section provides a main passage for fuel that comprises an inlet 13 connectable to a fuel supply line, not shown, a throat 14 and an outlet 17 connectable to a manifold or other fitting, not shown, leading to the fuel tank or tanks.

The regulator section includes a body 19 having an inlet end 20 for anti-icing fluid, a passage 21 connecting the inlet end to a valve chamber 22 and with a check valve 23 in the passage to prevent back flow through the passage. A modulating valve 24 is mounted in chamber 22 and has a poppet portion 27 that cooperates with a valve seat 28 that surrounds another passage 29 that connects chamber 22 with an upper chamber 30 formed between a flexible diaphragm 31 and a wall of a cavity 32 in the valve body 19. Passage 29 is conveniently formed in a retainer 33 bolted to body 19 and sealed by a resilient packing 34.

Valve 24 has a cylindrical extension 37 extending through an opening 38 that connects valve chamber 22 with a chamber 39 closed by a cap 40. Chambers 22 and 39 are sealed from each other by a resilient packing 41 that is in sliding sealing contact with cylindrical valve extension 37. The diameter of such sealing contact is preferably the same diameter as valve seat 28 so that valve 24 is pressure balanced with respect to fluid within chamber 22 when the valve is closed, although for some applications it may be either slightly larger or slightly smaller for obtaining a desired imbalance in either direction. Valve 24 is urged toward its closed position by a spring 45 and it has a central duct 42 that at all times connects chambers 39 and 30.

Another passage 43 connects chamber 30 with venturi throat 14 through an orifice 44 whose size may be varied by an adjustable needle valve 47 threaded into the body 19 as at 48. Still another passage 49 connects the venturi inlet 13 with a lower chamber 50 formed between diaphragm 31 and another wall of cavity 32. Passage 21, valve chamber 22, passage 29, chamber 30, passage 43 and orifice 44 comprise an auxiliary passage through which anti-icing fluid flows from inlet end 20 to venturi throat 14.

OPERATION

When the aircraft tank is to be filled, the pumps, not shown, for the fuel supply and the anti-icing fluid supply are turned on. Fuel under a predetermined pressure is delivered to venturi inlet 13 and anti-icing fluid, at a higher pressure than the fuel, is delivered to auxiliary passage inlet end 20. Initially, regulator valve 27 is closed by spring 45. Fuel under pressure from venturi inlet 13 passes through passage 49 into chamber 50 beneath diaphragm 31 to move the same against valve 24 and raise the latter off its seat 28.

Anti-icing fluid will then flow past valve 24 into chamber 30 but with a pressure drop occurring in the fluid as it flows past valve 24. When the pressure in chamber 30 builds up to the point where its downward force on diaphragm 31 plus the the pressure of spring 45 is equal to the upward force exerted on the diaphragm by fuel pressure in chamber 50, valve 24 will be in an equilibrium position. Because the closing force of spring 45 is negligible in comparison to the large effective areas of the diaphragm, the open position of valve 24 is so modulated that the pressure of the anti-icing fluid in chamber 30 is maintained essentially equal to that of the fuel in chamber 50 and venturi inlet 13.

As is well known the pressure of fuel in the venturi throat 14 is less than the pressure in venturi inlet 13. Because the pressure of anti-icing fluid in chamber 30, and hence in passage 43 is essentially the same as the pressure of fuel in venturi inlet 13, it will be higher than the pressure of fuel in venturi throat 14 and anti-icing fluid will be drawn from passage 43 through orifice 44 into venturi throat 14 where it will mix with incoming fuel and be carried through venturi outlet 17 into the fuel tank.

The flow rate of anti-icing fluid into venturi throat 14 will be proportional to the square root of the differential pressure across orifice 44. Since this differential is the same as the differential in velocity pressures between inlet 13 and venturi throat 14, and because the differential in the velocity pressures is proportional to the square of the fuel flow rate, the flow rate of the anti-icing fluid will be exactly proportional to the fuel flow rate. Thus the anti-icing fluid will be metered into the fuel at a fixed ratio independent of the fuel flow rate.

The needle valve 47 is theoretically not required but is provided for fine tuning of the device by making orifice 44 adjustable for compensating for manufacturing tolerances in forming the orifice and venturi. Likewise check valve 23 is not essential but is included as a precaution against back flow of fuel through valve 24 into the supply of anti-icing fluid.

Duct 42 is provided through valve 24 for equalizing fluid pressures in chamber 39 and passage 29 to insure that valve 24 is balanced with respect to fluid pressures acting thereon.

We claim:

1. A device for mixing two liquids comprising a venturi section and a regulator section; said venturi section having a main passage therethrough for a first liquid, said main passage including an inlet, an outlet and a restricted venturi throat between said inlet and outlet; and said regulator section having an auxiliary passage therethrough for a second liquid, said auxiliary passage including an inlet end and an outlet end that communicates with said main passage through a restricted orifice at said venturi throat, valve means in said auxiliary passage for controlling flow of the second liquid through said auxiliary passage, and a movable wall in said regulator section, said movable wall having opposed areas exposed respectively to the liquid pressure in said main passage between said inlet and venturi throat and to the liquid pressure in said auxiliary passage between said valve means and outlet end and being movable in said regulator section in accordance with the differential in pressures acting upon said opposed areas, and said valve means including means responsive to movement of said movable wall for operating said valve means between open and closed positions, whereby the liquid pressure differential across said restricted orifice may be equated to the liquid pressure differential between said inlet and venturi throat for fixed ratio mixing of the second liquid into the first liquid at said venturi throat.

2. The device of claim 1 wherein said valve means includes a valve chamber connecting said inlet end and outlet end, and a valve element contained in said valve chamber for movement to open and close said valve chamber to said outlet end.

3. The device of claim 2 wherein said valve means further includes spring means for urging said valve element to a closed position.

4. The device of claim 1 further comprising means for adjusting the size of said restricted orifice.

5. The device of claim 1 further comprising check valve means between said valve means and said inlet end to prevent reverse flow of the second liquid from said valve means to said inlet end.

6. A device for mixing a second liquid into a first liquid at a predetermined ratio independent of the flow rate of the first liquid, said device comprising: a venturi section and a regulator section; said venturi section having a main passage for the first liquid, said main passage having an inlet, an outlet and a restricted venturi throat between said inlet and outlet; said regulator section having an auxiliary passage for the second liquid, said auxiliary passage having an inlet end connectable to a pressurized source of the second liquid and an outlet end that communicates with said main passage through a restricted orifice at said venturi throat, and regulator means for equating the pressure of the second liquid in said auxiliary passage at said outlet end to that of the first liquid in said main passage between said inlet and venturi throat, said regulator means including valve means in said auxiliary passage for controlling flow of the second liquid from said inlet end to said outlet end, and a movable wall in said regulator section, said movable wall having opposed areas exposed respectively to the liquid pressure in said main passage between said inlet and venturi throat and to the liquid pressure in said auxiliary passage between said valve means and outlet end and being movable in said regulator section in accordance with the differential in pressures acting upon said opposed areas, and said valve means including a valve seat and a valve element movable into and out of engagement with said valve seat respectively for opening and closing said valve means, said valve element having a portion extending through said valve seat and being engageable with said movable wall for effecting modulated positioning of said valve element relative to said valve seat.

7. The device of claim 6 wherein said valve means further includes a spring acting on said valve element for urging same toward its closed position.

8. The device of claim 7 wherein the closing force of said spring is negligible in comparison to the effective areas of the movable wall subject to the pressures acting thereon.

9. A device for mixing two liquids comprising a venturi section and a regulator section; said venturi section having a main passage therethrough for a first liquid, said main passage including an inlet, an outlet and a restricted venturi throat between said inlet and outlet; and said regulator section having an auxiliary passage therethrough for a second liquid, said auxiliary passage including an inlet end and an outlet end that communicates through a restricted orifice with said main passage at said venturi throat, valve means in said auxiliary passage for controlling flow of the second liquid through said auxiliary passage, and a movable wall in said regulator section, said movable wall having opposed areas exposed respectively to the liquid pressure in said main passage between said inlet and venturi throat and to the liquid pressure in said auxiliary passage between said valve means and outlet end and being movable in said regulator section in accordance with the differential in pressures acting upon said opposed areas, said valve means including means responsive to movement of said movable wall for operating said valve means between open and closed positions, whereby the liquid pressure differential across said restricted orifice may be equated to the liquid pressure differential between said inlet and venturi throat for fixed ratio mixing of the second liquid into the first liquid at said venturi throat, and said valve means further including a valve chamber connecting said inlet and outlet end, a valve element contained in said valve chamber for movement to open and close said valve chamber to said outlet end, and means for balancing said valve element when closed with respect to liquid pressure in said valve chamber.

10. The device of claim 9 wherein said valve means further includes means for balancing said valve element with respect to liquid pressure in said outlet end.

11. A device for mixing two liquids comprising a venturi section and a regulator section; said venturi section having a main passage therethrough for a first liquid, said main passage including an inlet, an outlet and a restricted venturi throat between said inlet and outlet; and said regulator section having an auxiliary passage therethrough for a second liquid, said auxiliary passage including an inlet end and an outlet end that communicates through a restricted orifice with said main passage at said venturi throat, valve means in said auxiliary passage for controlling flow of the second liquid through said auxiliary passage, and a movable wall in said regulator section, said movable wall having opposed areas exposed respectively to the liquid pressure in said main passage between said inlet and venturi throat and to the liquid pressure in said auxiliary passage between said valve means and outlet end and being movable in said regulator section in accordance with the differential in pressures acting upon said opposed areas, said valve means including means responsive to movement of said movable wall for operating said valve means between open and closed positions, whereby the liquid pressure differential across said restricted orifice may be equated to the liquid pressure differential between said inlet and venturi throat for fixed ratio mixing of the second liquid into the first liquid at said venturi throat, and said valve means further including a valve chamber connecting said inlet end and outlet end, a valve element contained in said valve chamber for movement to open and close said valve chamber to said outlet end, and means for balancing said valve element with respect to liquid pressure in said outlet end.

12. A device for mixing two liquids comprising a venturi section and a regulator section; said venturi section having a main passage therethrough for a first liquid, said main passage including an inlet, an outlet and a restricted venturi throat between said inlet and outlet; and said regulator section having an auxiliary passage therethrough for a second liquid, said auxiliary passage including an inlet end and an outlet end that communicates through a restricted orifice with said main passage at said venturi throat, valve means in said auxiliary passage for controlling flow of the second liquid through said auxiliary passage, and a movable wall in said regulator section, said movable wall having opposed areas exposed respectively to the liquid pressure in said main passage between said inlet and venturi throat and to the liquid pressure in said auxiliary passage between said valve means and outlet end and being movable in said regulator section in accordance with the differential in pressures acting upon said opposed areas, said valve means including means responsive to movement of said movable wall for operating said valve means between open and closed positions, whereby the liquid pressure differential across said restricted orifice may be equated to the liquid pressure differential between said inlet and venturi throat for fixed ratio mixing of the second liquid into the first liquid at said venturi throat, and said valve means further including a valve chamber connecting said inlet end and outlet end, a valve element contained in said valve chamber for movement to open and close said valve chamber to said outlet end, a valve seat engageable by said valve element for closing said valve chamber to said outlet end, and a cylindrical bore open to said valve chamber, said valve element having a cylindrical portion extending into said bore and sealing said bore from said valve chamber, and said cylindrical portion being substantially the same diameter as said valve seat for pressure balancing said valve element with respect to liquid pressure in said valve chamber.

13. The device of claim 12 wherein said valve means further includes a balancing chamber open to said bore opposite said valve chamber, and duct means connecting said balancing chamber with said outlet end to balance said valve element with respect to liquid pressure in said second chamber.

14. The device of claim 13 wherein said duct means is through said valve element.

15. A device for mixing a second liquid into a first liquid at a predetermined ratio independent of the flow rate of the first liquid, said device comprising: a venturi section and a regulator section; said venturi section having a main passage for the first liquid, said main passage having an inlet, an outlet and a restricted venturi throat between said inlet and outlet; said regulator section having an auxiliary passage for the second liquid, said auxiliary passage having an inlet end connectable to a pressurized source of the second liquid and an outlet end that communicates with said main passage through a restricted orifice at said venturi throat, and regulator means for equating the pressure of the second liquid in said auxiliary passage at said outlet end to that of the first liquid in said main passage between said inlet and venturi throat, said regulator means including valve means in said auxiliary passage for controlling flow of the second liquid from said inlet end to said outlet end, and a movable wall in said regulator section, said movable wall having opposed areas exposed respectively to the liquid pressure in said main passage between said inlet and venturi throat and to the liquid pressure in said auxiliary passage between said valve means and outlet end and being movable in said regulator section in accordance with the differential in pressures acting upon said opposed areas, said valve means including a valve seat and a valve element movable into and out of engagement with said valve seat respectively for opening and closing said valve means, said valve element having a portion extending through said valve seat and being engageable with said movable wall for effecting modulated positioning of said valve element relative to said valve seat, and said valve means further including a valve chamber, a balancing chamber and a bore between said valve chamber and balancing chamber, said valve element having an extension projecting through said bore into said balancing chamber, seal means for sealing the balancing chamber from said valve chamber, and duct means in said valve element connecting said balancing chamber with said outlet end.

* * * * *